(No Model.)  2 Sheets—Sheet 1.

A. A. HOUGHTON.
WEIGHING SCALE.

No. 362,628.  Patented May 10, 1887.

Witnesses.  Inventor.
H. C. Thayer  Alfred A. Houghton,
R. Mulholland  By James Sangster (No Model.) 2 Sheets—Sheet 2.

A. A. HOUGHTON.
WEIGHING SCALE.

No. 362,628. Patented May 10, 1887.

Witnesses.      Inventor.
R. N. Sangster.      Alfred A. Houghton.
Arthur Sangster      By James Sangster
                                             Atty.

UNITED STATES PATENT OFFICE.

ALFRED A. HOUGHTON, OF BUFFALO, NEW YORK.

WEIGHING-SCALE.

SPECIFICATION forming part of Letters Patent No. 362,628, dated May 10, 1887.

Application filed January 29, 1887. Serial No. 225,634. (No model.)

*To all whom it may concern:*

Be it known that I, ALFRED A. HOUGHTON, a citizen of the United States, residing in Buffalo, in the county of Erie and State of New York, have invented certain new and useful Improvements in Scales, of which the following is a specification.

My invention relates to certain improvements in even-balance scales having the working parts entirely covered or out of sight, and will be fully and clearly hereinafter described and claimed, reference being had to the accompanying drawings, in which—

Figure 1:
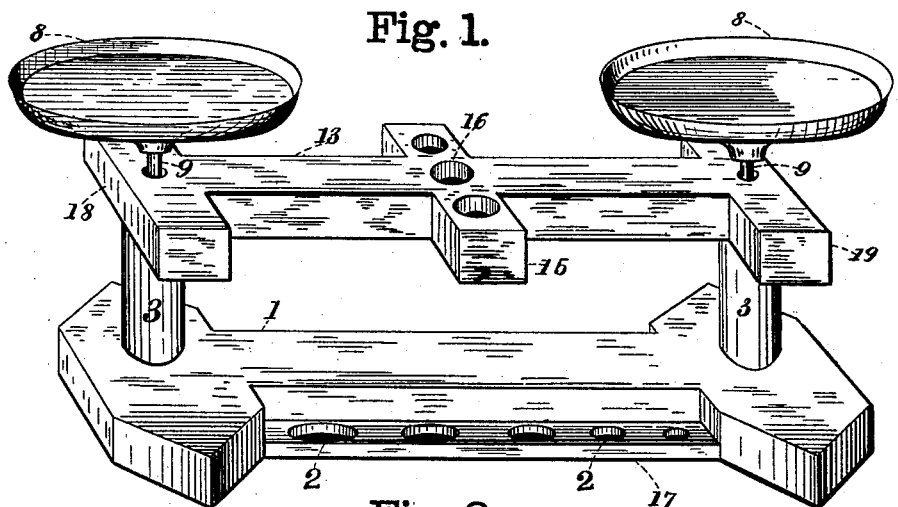
Figure 2:
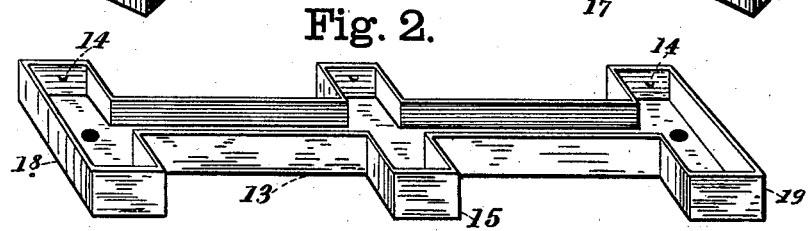
Figure 3:
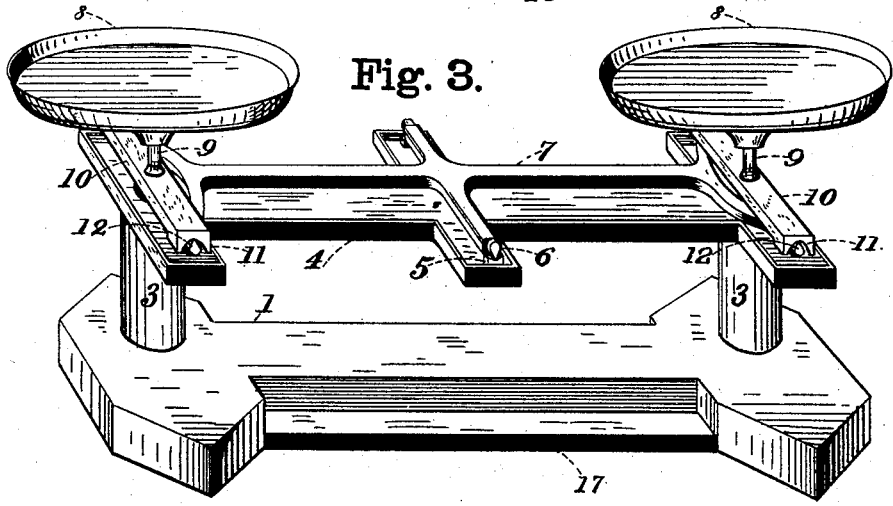
Figure 4:
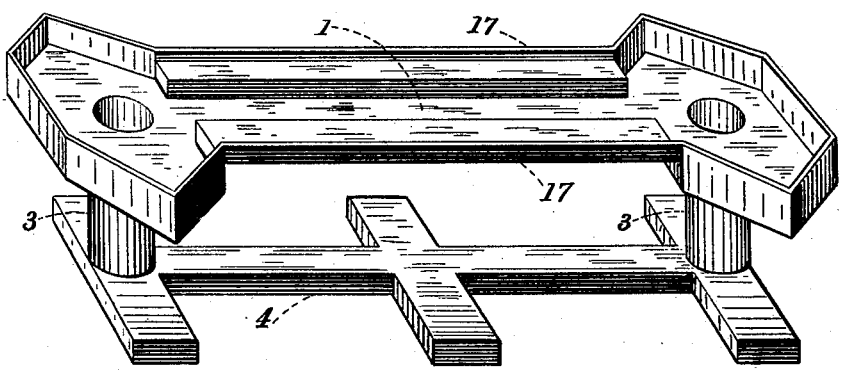
Figure 5:
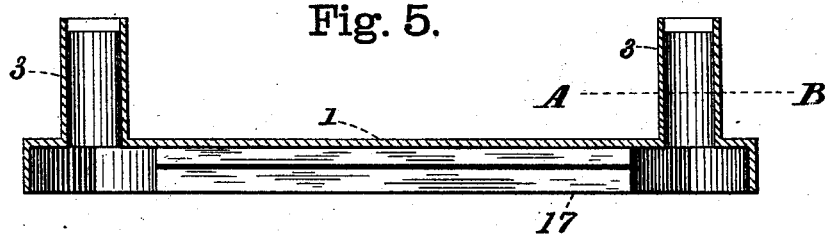
Figure 6:
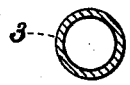

Figure 1 is a perspective view of the scale all complete. Fig. 2 is a perspective view of the under side of the removable casing for coving the pivots and other working parts of the scale connected therewith. Fig. 3 is a perspective view of the scale with the casing removed. Fig. 4 is a perspective view of the base with its hollow pillars and part 4 turned upside down. Fig. 5 is a vertical longitudinal section through the center of the base and hollow pillars, the part 4 being left off; and Fig. 6 is a horizontal section through one of the pillars, all parts below being left off or omitted.

The base 1 is hollow and provided with a row of shallow depressions or recesses, 2, adapted to receive small weights, or weights of various sizes. It is also provided with the hollow pillars 3 and hollow supporting-plate 4. These parts may be made separately and secured together in any well-known way, or either or all of them may be formed or cast in one piece with the base-piece 1. In the hollow supporting-plate 4 is the ordinary pivot-bearings 5, upon which the pivots 6 of the beam 7 rest. The supporting-plate 4 and the beam 7 being covered so that they cannot be seen, it is not necessary that either should be painted or finished nicely, the pivots and bearings being the only parts that require to be finished and fitted carefully.

8 represents the ordinary scale-pans, which may be made in any well-known way or of any required shape. To the scale-pans 8 are rigidly secured the vertical supporting-rods 9. These rods pass through and are rigidly fixed to the cross-bars 10, having bearings 11, adapted to rest upon the pivots 12 on the beam 7. The rods 9 are made in the ordinary way and pass down through the pillars 3 into the base 1, where they are pivoted to a connecting-rod in the usual manner well known to every scale-maker. The depressions 2 are preferably placed on the lower part, 17; but they may, if desired, be placed on the top of the base 1, just below the casing 13. The upper casing or covering-piece, 13, is adapted to fit nicely over the supporting-plate 4 and rest upon inwardly-projecting pieces 14, or it may be fitted thereto in any other well-known way, and across the central portion, 15, may be arranged a series of recesses, 16, adapted to receive weights. Its object is to inclose and cover the beam and working parts, the hollow end pieces, 18 and 19, being adapted to cover the cross-bars 10.

If desired, the depressions 2 and 16 may be dispensed with and the parts left plain; but it is more convenient to have them. The upper case, 13, is finished to correspond with the base and pillars.

The base 1, the pillars 3, and case 13 all being plain are easily finished, and may be either nickel-plated, enameled in imitation marble, or finished in any well-known way without much expense. The working parts, which are expensive to finish, are entirely out of sight, except merely the vertical rods 9. In some respects this scale resembles the druggist's box-scales, in which all the working parts are inclosed in a box, which is bulky and heavy. It has all the advantages of a box-scale, and is almost as light as an ordinary scale.

Another advantage over the box-scale is the room under the case 13, where weights may be placed, if required. If desired, the part 4 may be a flat plate without any raised rim or sides. It would be just as well adapted to receive the bearings for the beam, but would not be quite so strong. If necessary, the covering-case 13 may be made easily removable, and it may be made all of one width and wide enough so as to dispense with the portions 15, 18, and 19; but it would not answer as well, because it would be more bulky and heavy.

I claim as my invention—

1. A scale-frame consisting of a hollow base provided with hollow vertical pillars, and a supporting-plate to receive the bearings for sustaining the beam, in combination with a casing for inclosing the beam and its working parts, substantially as described.

2. In a scale-frame, the combination of a hollow base having the depressions 2 to receive weights, the hollow pillars 3, and beam-supporting plate 4, with a covering-casing, 13, for covering the plate 4 and inclosing the cross-pieces 10, and the beam and its working parts within the casing, as above set forth.

3. In a scale-frame, the combination of the hollow base 1, the portion 17, provided with a series of depressions to receive weights, the hollow pillars 3, and beam-supporting plate 4, with a casing, 13, having the hollow cross portion 15, a series of depressions to receive weights, and the hollow cross portions 18 and 19, as and for the purposes described.

ALFRED A. HOUGHTON.

Witnesses:
A. C. THAYER,
JAMES SANGSTER.